(12) United States Patent
Kusano (10) Patent No.: US 11,343,404 B2
(45) Date of Patent: May 24, 2022

(54) INFORMATION PROCESSING APPARATUS WITH A SIMULATION MODE AND NON-TRANSITORY COMPUTER READABLE MEDIUM STORING PROGRAM

(71) Applicant: FUJIFILM Business Innovation Corp., Tokyo (JP)

(72) Inventor: Nobumi Kusano, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 172 days.

(21) Appl. No.: 16/445,234

(22) Filed: Jun. 19, 2019

(65) Prior Publication Data

US 2020/0007708 A1 Jan. 2, 2020

(30) Foreign Application Priority Data

Jun. 29, 2018 (JP) .............................. JP2018-124477

(51) Int. Cl.
*H04N 1/327* (2006.01)
*H04N 1/00* (2006.01)

(52) U.S. Cl.
CPC ..... *H04N 1/32736* (2013.01); *H04N 1/00031* (2013.01); *H04N 1/00395* (2013.01); *H04N 1/00779* (2013.01)

(58) Field of Classification Search
CPC .................................................. H04N 1/32736
USPC .............................................. 358/1.15, 1.14
See application file for complete search history.

(56) References Cited

U.S. PATENT DOCUMENTS

| | | | |
|---|---|---|---|
| 2006/0221378 A1* | 10/2006 | Asahara | H04N 1/00347 358/1.14 |
| 2007/0188791 A1* | 8/2007 | Utsunomiya | H04N 1/00482 358/1.13 |
| 2008/0085499 A1 | 4/2008 | Horvath | |
| 2010/0191866 A1 | 7/2010 | Kurogi et al. | |

FOREIGN PATENT DOCUMENTS

| | | |
|---|---|---|
| JP | 2002351301 | 12/2002 |
| JP | 2003233513 | 8/2003 |
| JP | 2008100060 | 5/2008 |
| JP | 2010167740 | 8/2010 |
| JP | 2011181061 | 9/2011 |

OTHER PUBLICATIONS

"Office Action of Japan Counterpart Application", dated Jan. 25, 2022, with English translation thereof, p. 1-p. 9.
"Office Action of Japan Counterpart Application", dated Apr. 5, 2022, with English translation thereof, p. 1-p. 5.

* cited by examiner

*Primary Examiner* — Jacky X Zheng
(74) *Attorney, Agent, or Firm* — JCIPRNET (57) ABSTRACT

An information processing apparatus includes a first specifying section that receives specification of an execution target function from plural functions, a second specifying section that receives specification of a normal mode or a simulation mode, and an execution section that executes a process for implementing the specified function in the mode received by the second specifying section.

12 Claims, 12 Drawing Sheets

INFORMATION PROCESSING APPARATUS WITH A SIMULATION MODE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-124477 filed Jun. 29, 2018.

BACKGROUND

(i) Technical Field

The present invention relates to an information processing apparatus and a non-transitory computer readable medium storing a program.

(ii) Related Art

Information processing apparatuses having plural functions are widely used. One example of such information processing apparatuses is exemplified by a multifunction peripheral that is an image forming apparatus having a FAX transmission function and a printing function together. Some of the information processing apparatuses simulates a specific function and presents a result of simulation to a user (refer to JP2008-100060A). For example, in the case of the multifunction peripheral, a preview of output corresponds to the simulation.

SUMMARY

Some function of an information processing apparatus may accompany execution of a process that is unrestorable to an original state in a case where the process is executed. Specifically, processes accompanied by deleting or changing data, updating instructional information related to a user (a meter or a count of a counter), charging, and the like are exemplified. In the case of an information processing apparatus having plural functions, the user of the information processing apparatus may not use all of the plural functions, and some function may be unknown to the user. In such a case, the user may desire to try the unknown function but also may hesitate to use the unknown function due to an uncertainty that restoration to the original state may not be available.

Aspects of non-limiting embodiments of the present disclosure relate to an information processing apparatus and a non-transitory computer readable medium storing a program that provide a user with an option to execute a function based on a simulation mode in a case where an information processing apparatus having plural functions is used.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first specifying section that receives specification of an execution target function from a plurality of functions, a second specifying section that receives specification of a normal mode or a simulation mode, and an execution section that executes a process for implementing the specified function in the mode received by the second specifying section.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Configuration

Figure 1:
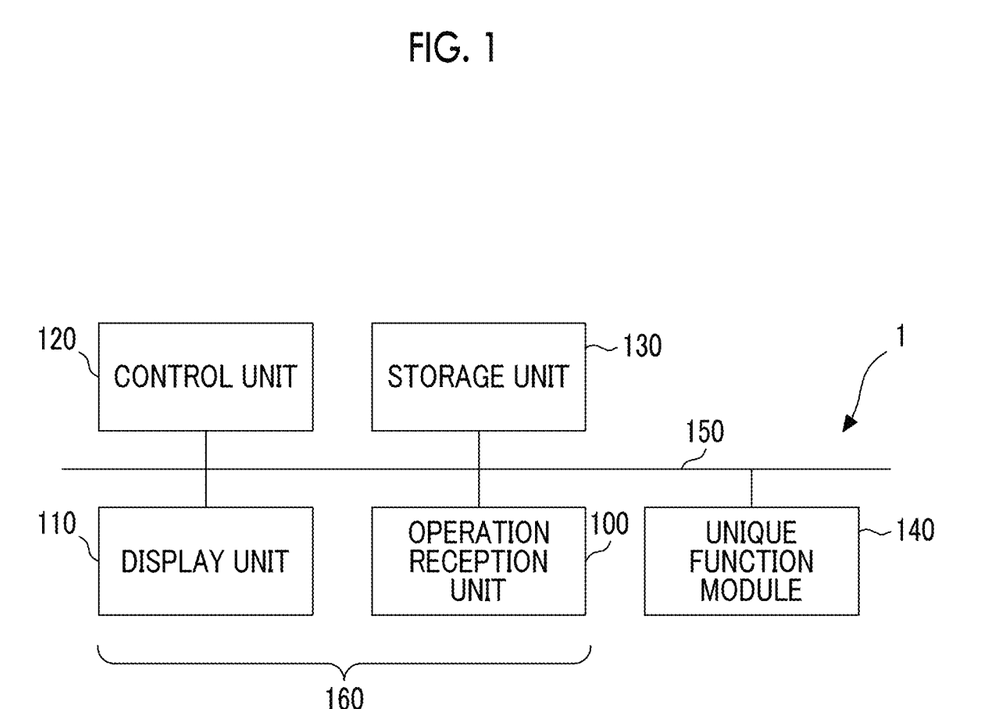
FIG. 1 is a diagram illustrating a hardware configuration example of an information processing apparatus 1 according to an exemplary embodiment of the present invention.

FIG. 1 is a diagram illustrating one example of an overall configuration of an information processing apparatus 1 according to an exemplary embodiment of the present invention. The information processing apparatus 1 is an image forming apparatus (that is, a multifunction peripheral) that has a FAX transmission and reception function and a printing function. As illustrated in FIG. 1, the information processing apparatus 1 includes an operation reception unit 100, a display unit 110, a control unit 120, a storage unit 130, a unique function module 140 implementing plural functions (the printing function, the FAX transmission and reception function, and the like) unique to the information processing apparatus 1, and a bus 150 mediating data exchange among these constituents.

The unique function module 140 includes an automatic transport mechanism, an image reading module, an image forming module, and a communication module. The automatic transport mechanism transports an original document on which an image as a target for FAX transmission or copying is formed. The image reading module reads the image from the original document. The image forming module forms the image or the like read by the image reading module on a print paper or the like. The communication module transmits image data representing the image read by the image reading module through a communication line.

The storage unit 130 includes a volatile storage unit such as a random access memory (RAM) and a non-volatile storage unit such as a flash memory (not illustrated in FIG. 1). A program for causing the control unit 120 to function as a control center of the information processing apparatus 1 is stored in advance in the non-volatile storage unit. The volatile storage unit is used as a work area in a case where the program is executed. In addition, the non-volatile storage unit stores various data. One example of data stored in the non-volatile storage unit is exemplified by main body recipient table list data that represents plural mail addresses registered in advance as candidates of a recipient of an electronic mail transmitted from the information processing apparatus 1.

The display unit 110 is, for example, a liquid crystal display. The display unit 110 displays various user interface screens for a user to use the information processing apparatus 1 under control of the control unit 120. The operation reception unit 100 is, for example, a pressure sensor or an electrostatic sensor that is transparent and is formed in a sheet shape. The operation reception unit 100 is bonded to the display unit 110 to cover a display area of the display unit 110. The operation reception unit 100 forms a touch panel 160 along with the display unit 110. The operation reception unit 100 outputs operation content data corresponding to the content of operation performed by the user to the control unit 120 through the bus 150. Accordingly, the content of operation performed by the user is delivered to the control unit 120.

The control unit 120 is, for example, a central processing unit (CPU). The control unit 120 operates in accordance with the program stored in the storage unit 130 and functions as a control center of the information processing apparatus 1. For example, in a case where an instruction to copy the original document is provided by an operation performed on the operation reception unit 100, the control unit 120 controls the operation of the unique function module 140 such that a copy corresponding to the content of the instruction is produced. Similarly, in a case where an instruction to perform FAX transmission of the original document is provided by an operation performed on the operation reception unit 100, the control unit 120 controls the operation of the unique function module 140 such that image data is transmitted to the recipient in the instruction.

The plural functions implemented by the unique function module 140 include a function accompanying execution of a process that is unrestorable to the state before execution. A specific example of the process unrestorable to the state before execution is exemplified by reading of the original document using the automatic transport mechanism, a process of forming an identification image on the read original document, a data communication process accompanying a charging process, a process of logging in to a network, and a process of writing data into a predetermined device.

The method of defining the "state before execution" and "restoration" and determination criteria of the definitions are not limited. These definitions are concepts that may be changed depending on the permission of the user, a situation where the definitions are used, and the like. It is not necessary to uniquely define a function and a restorability of the function. For example, in a case where specifications indicate that a log is recorded in the case of using a certain function, "restoration" means returning to a state where the log is not recorded, given that the state where the log is not recorded is defined as the "state before execution". While this function is obviously defined as unrestorable for general users, the function may be defined as restorable for a user who has a permission to edit logs. For example, the function unrestorable to the state before execution may be defined as all functions that accompany charging along with execution thereof, or may be defined as all functions that consume physical resources (paper, toner, ink, and the like).

In a case where a function that is unknown to the user of the information processing apparatus 1 is included in the plural functions implemented by the unique function module 140, the user may desire to try the unknown function but also may hesitate to use the unknown function due to uncertainties. The information processing apparatus 1 of the present exemplary embodiment is configured to enable the user to feel certain in the case of using the unknown function.

More specifically, the control unit 120 that operates in accordance with the program operates in any of two operation modes of a normal mode and a simulation mode. The normal mode is an operation mode in which actual processing is executed in accordance with the content of operation performed by the user. Meanwhile, the simulation mode is an operation mode in which a simulation is performed instead of executing actual processing, and the result of simulation is presented to the user.

Figure 2:
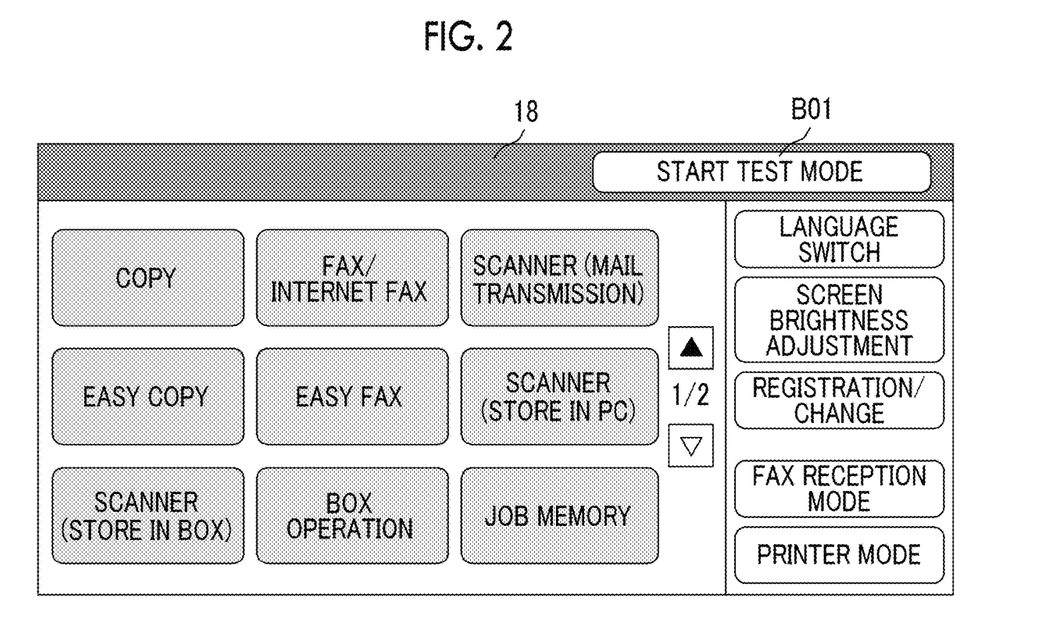
FIG. 2 is a diagram illustrating one example of a menu screen displayed on a display unit 110 of the information processing apparatus 1 in a normal mode.

In the normal mode, the control unit 120 displays a menu screen illustrated in FIG. 2 on the display unit 110. In the simulation mode, the control unit 120 displays a menu screen illustrated in FIG. 3 on the display unit 110. As illustrated in FIG. 2, the following three types of virtual operators are arranged in the menu screen of the normal mode. The first type is a virtual operator (hereinafter, referred to as "function buttons") that corresponds to each of the plural functions of the information processing apparatus 1 such as "copy", "fax/internet fax", "scanner (mail transmission)", "easy copy", "easy fax", "scanner (store in PC)", "scanner (store in box)", "box operation", and "job memory". The user who visually recognizes the menu screen illustrated in FIG. 2 may instruct the information processing apparatus 1 to perform a function desired for use by performing a touch operation on any of the plural function buttons. The second type is a virtual operator (hereinafter, referred to as an "operation management button") for managing the operation of the information processing apparatus 1 such as "language switch", "screen brightness adjustment", "registration/change", "communication management report", "fax reception mode", and "printer mode". The third type is a virtual operator "start test mode button" B01 for causing the user to provide an instruction to switch the operation mode of the information processing apparatus 1 to the simulation mode from the normal mode.

The menu screen of the simulation mode includes the function buttons and the operation management button in an identical manner to the menu screen of the normal mode, and the layout of these buttons is identical to the layout of the buttons in the menu screen of the normal mode. That is, the user who visually recognizes the menu screen illustrated in FIG. 3 may instruct the information processing apparatus 1 to perform a function desired to be simulated, by performing the same operation (touch operation performed on a function button) as in the case of the normal mode. As is apparent from comparison between FIG. 2 and FIG. 3, the menu screen of the simulation mode is different from the menu screen of the normal mode in that a "finish test mode button" B02 is disposed instead of the "start test mode button" B01. The information processing apparatus 1 notifies the user that the currently applied operation mode is the simulation mode, by displaying the "finish test mode button" B02 in the menu screen of the simulation mode.

Figure 4A:
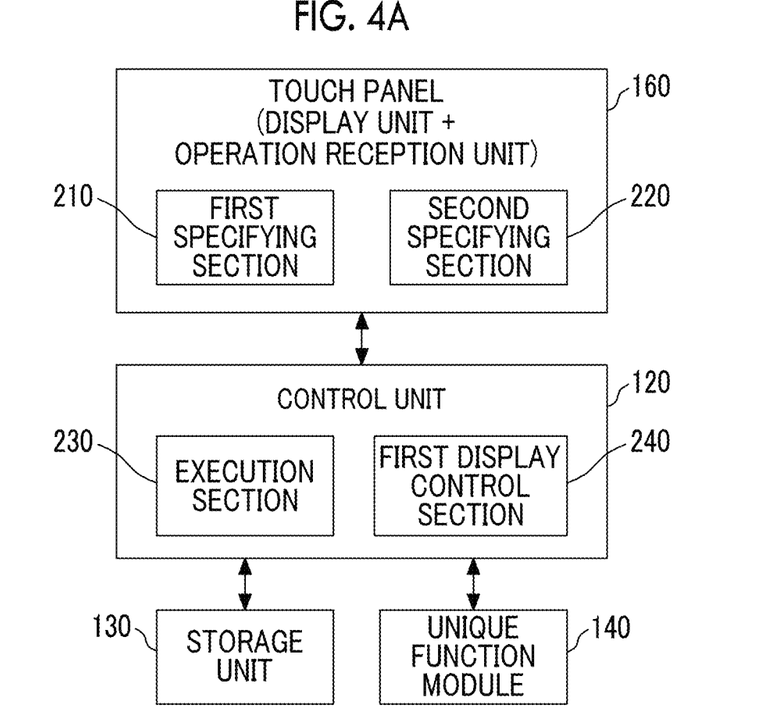
FIG. 4A is a function block diagram illustrating a functional configuration example of the information processing apparatus 1.

FIG. 4A is a function block diagram illustrating one example of a functional configuration of the information processing apparatus 1.

Figure 3:
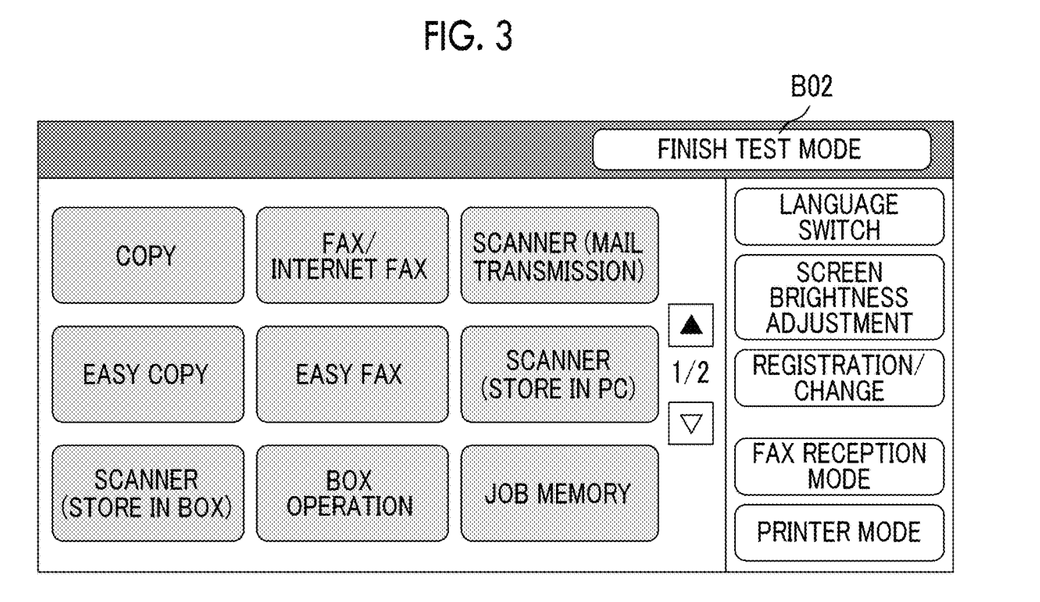
FIG. 3 is a diagram illustrating one example of a menu screen displayed on the display unit 110 of the information processing apparatus 1 in a simulation mode.

As described above, the user who visually recognizes the menu screen illustrated in FIG. 2 or FIG. 3 may instruct the information processing apparatus 1 to perform an execution target or simulation target function by performing a touch operation on any of the plural function buttons. That is, the operation reception unit 100 and the display unit 110 displaying the menu screen illustrated in FIG. 2 or FIG. 3 function as a first specifying section 210 that receives specification of the execution target function from the plural functions under control of the control unit 120. The user who visually recognizes the menu screen illustrated in FIG. 2 may instruct the information processing apparatus 1 to switch the operation mode to the simulation mode from the normal mode by performing a touch operation on the "start test mode button" B01. Similarly, the user who visually recognizes the menu screen illustrated in FIG. 3 may instruct the information processing apparatus 1 to switch the operation mode to the normal mode from the simulation mode by performing a touch operation on the "finish test mode button" B02. That is, the display unit 110 and the operation reception unit 100 function as a second specifying section 220 that receives specification of the normal mode or the simulation mode under control of the control unit 120.

The control unit 120 that operates in accordance with the program functions as an execution section 230 and a first display control section 240 as illustrated in FIG. 4A. The execution section 230 executes a process for implementing the function specified by the first specifying section 210 in the mode received by the second specifying section 220. In a case where the mode received by the second specifying section 220 is the normal mode, the execution section 230 actually executes the process for implementing the function specified by the first specifying section 210. Meanwhile, in a case where the mode received by the second specifying section 220 is the simulation mode, the execution section 230 does not actually execute the process for implementing the function specified by the first specifying section 210 and simulates the process. In this simulation, even in a case where a process of writing data into the storage unit 130, a data transmission process using the communication module, or the like occurs, the execution section 230 does not execute the process and executes the process by reading the process using redirection or the like. The reason is for avoiding execution of the process unrestorable to the state before execution.

The first display control section 240 displays the result of the process for implementing the function received by the first specifying section 210. As will be described in detail below, the first display control section 240 adds the identification image to the result of the process executed in the simulation mode and displays the result of the process so that the user may easily identify the result of the process executed in the simulation mode and the result of the process executed in the normal mode. The reason is for enabling the user to distinguish between the actual process result and the result of simulation.

Figure 4B:
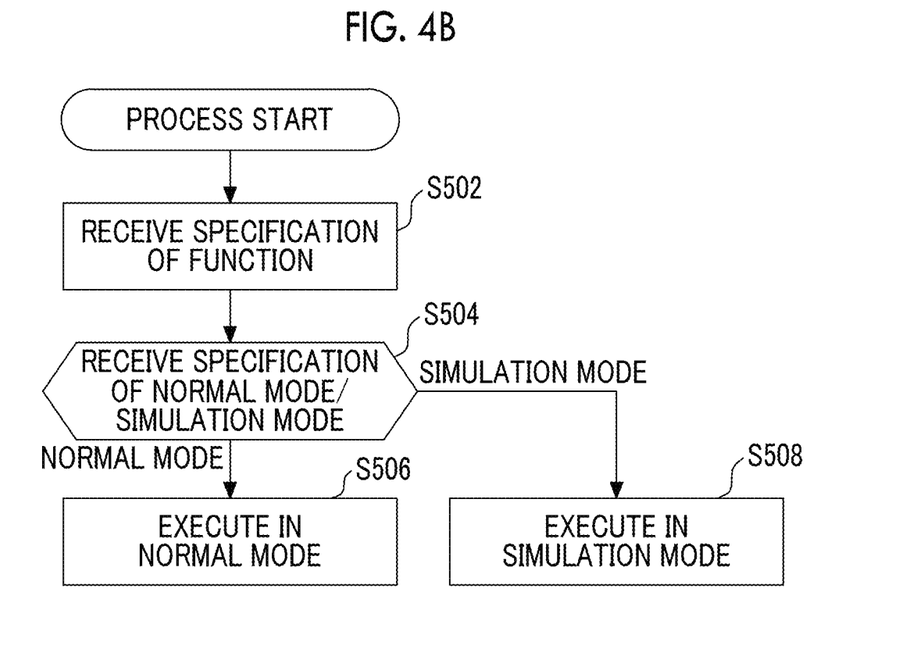
FIG. 4B is a flowchart illustrating a summary of operation of the information processing apparatus 1.

FIG. 4B illustrates one example of a summary of operation of the information processing apparatus 1. First, in a case where the execution target function is specified from the plural functions by the user, the information processing apparatus 1 receives the specification (S502). The information processing apparatus 1 receives specification of any of the normal mode or the simulation mode (S504). The information processing apparatus 1 executes the process for implementing the specified function in the mode received by the second specifying section (S506, S508).

Next, the operation of the information processing apparatus 1 at the time of switching the operation mode to the simulation mode from the normal mode and in the simulation mode will be described with reference to FIG. 5 to FIG. 18.

In a case where the user performs a touch operation on the "start test mode button" B01 in a situation where the menu screen (refer to FIG. 2) of the normal mode is displayed on the display unit 110, the operation reception unit 100 provides the operation content data indicating the content of operation performed by the user to the control unit 120. In a case where the control unit 120 receives the operation content data indicating the touch operation performed on the "start test mode button" B01, the control unit 120 displays a notification screen illustrated in FIG. 5 on the display unit 110.

Figure 5:
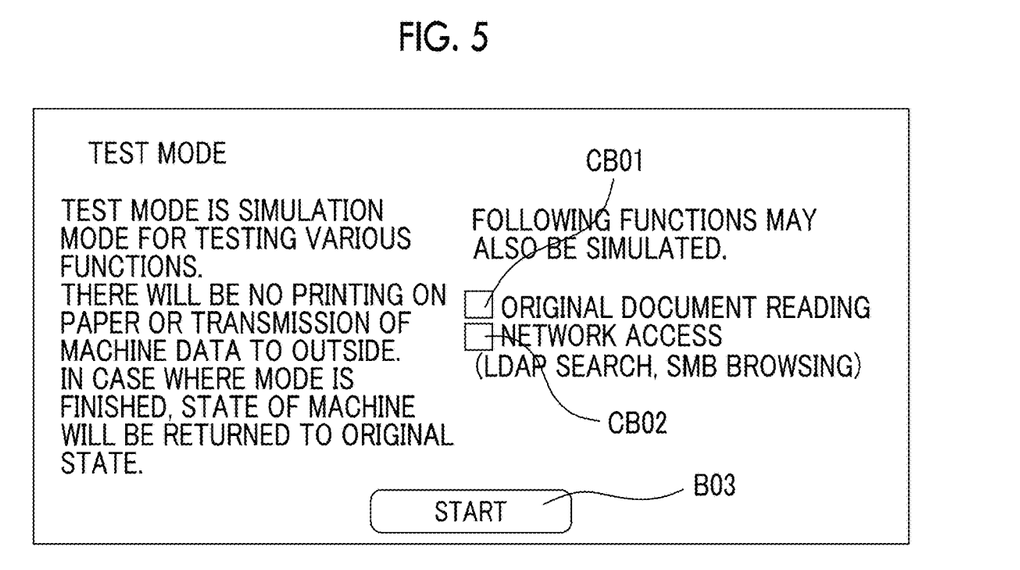
FIG. 5 is a diagram illustrating one example of a notification screen displayed in a case where an operation mode of the information processing apparatus 1 is switched to the simulation mode from the normal mode.

The user who visually recognizes the notification screen illustrated in FIG. 5 may perform a simulation related to original document reading by entering a check into a check box CB01 corresponding to "original document reading" and pressing a start button B03. The user may perform a simulation related to network access by entering a check into a check box CB02 corresponding to "network access (LDAP search, SMB browsing)" and pressing the start button B03. In a case where a device that impresses the original document with a stamp at the time of original document reading is included in the unique function module 140, original document reading may be set as the simulation target at all times without confirmation of the user. Hereinafter, the operation of the information processing apparatus 1 will be illustratively described in a case where a simulation related to network access is performed.

In a case where an operation of entering a check into the check box CB02 and pressing the start button B03 on the notification screen illustrated in FIG. 5 is performed on the operation reception unit 100, the operation content data representing the content of operation is provided to the control unit 120. The control unit 120 starts a simulation related to network access (in the exemplary embodiment, a simulation of electronic mail transmission) with a trigger event that the operation content data is received, and displays a mail transmission screen illustrated in FIG. 6 on the display unit 110. As will be described in detail below, the mail transmission screen of the normal operation mode is different from the mail transmission screen (refer to FIG. 6) of the simulation mode in that the "start test mode button" B01 is disposed instead of the "finish test mode button" B02.

Figure 6:
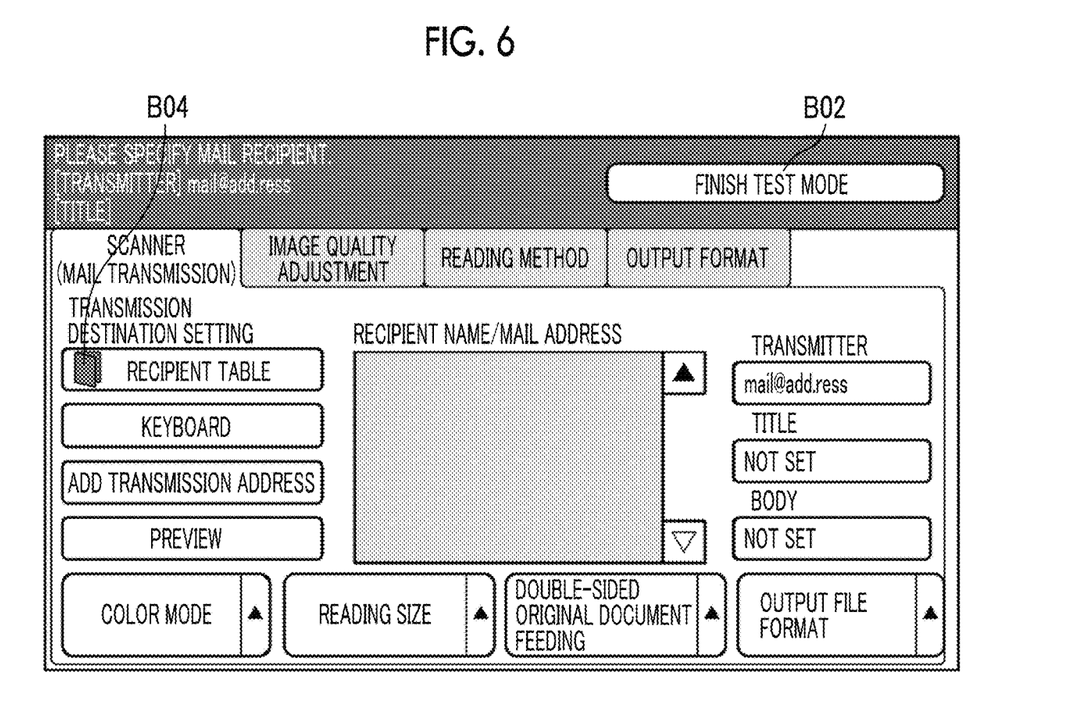
FIG. 6 is a diagram illustrating one example of a screen displayed on the display unit 110 in a simulation related to network access.

The user who visually recognizes the mail transmission screen illustrated in FIG. 6 may specify a recipient name/mail address as a transmission destination of an electronic mail and input a title and a body by performing the same operation as in the case of the mail transmission screen in the normal mode. For example, by performing a touch operation on a recipient table button B04 in FIG. 6, a recipient edit screen illustrated in FIG. 7 may be displayed on the display unit 110, and the recipient name/mail address may be specified. Specifically, a desired mail address may be selected from a "recipient name/mail address list" L01 in the recipient edit screen illustrated in FIG. 7, and the selected mail address may be specified as a mail address of "recipient", "Cc", or "Bcc" by performing a touch operation on any of a "recipient button" B05, a "Cc button" B06, or a "Bcc button" B07. A recipient name/mail address that may be actually specified in the normal mode is displayed in the "recipient name/mail address list" L01 in accordance with the main body recipient table list data stored in the storage unit 130.

Figure 7:
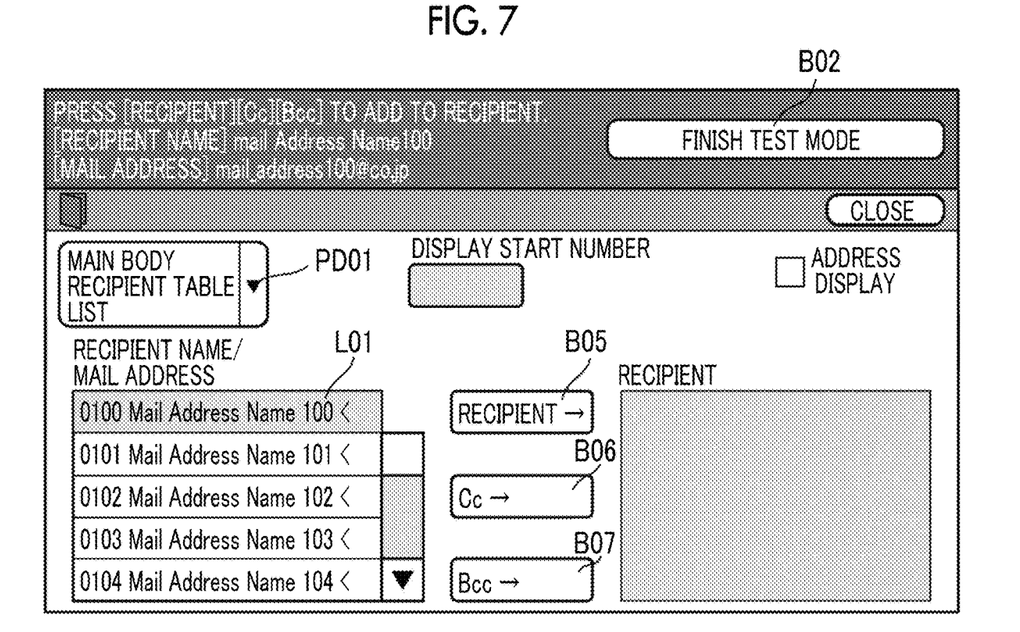
FIG. 7 is a diagram illustrating one example of a screen displayed on the display unit 110 in the simulation related to the network access.
Figure 8:
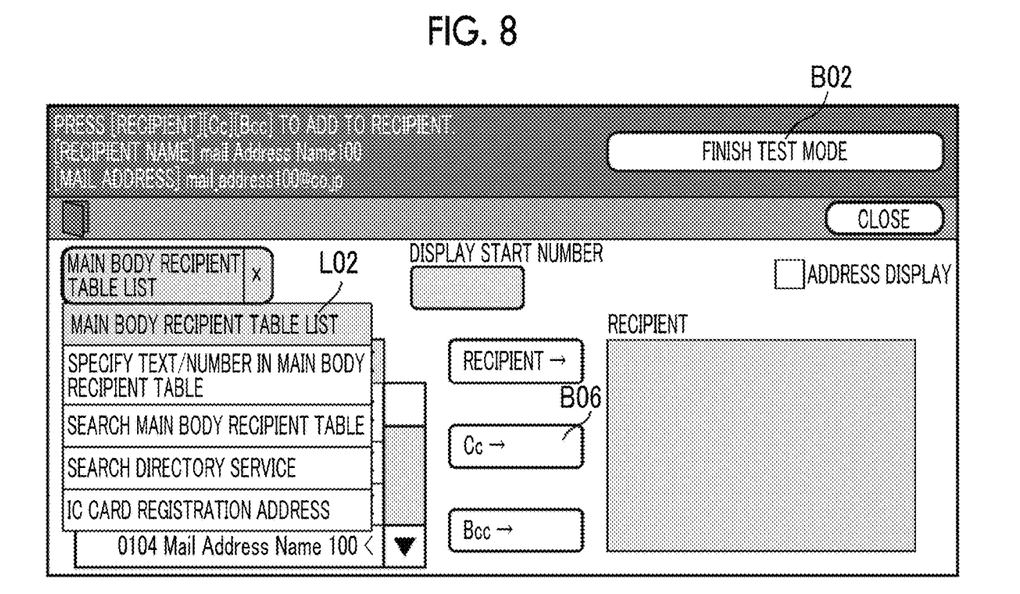
FIG. 8 is a diagram illustrating one example of a screen displayed on the display unit 110 in the simulation related to the network access.

The user who visually recognizes the recipient edit screen illustrated in FIG. 7 may instruct the information processing apparatus 1 to acquire a mail address to be specified as a recipient by directory search or the like, by performing a touch operation on a pull-down button PD01. In a case where a touch operation is performed on the pull-down button PD01, the control unit 120 displays a pull-down list L02 on the display unit 110 as illustrated in FIG. 8. The user may instruct the information processing apparatus 1 to perform a directory search for the mail address by selecting "directory search service" in the pull-down list L02.

Figure 9:
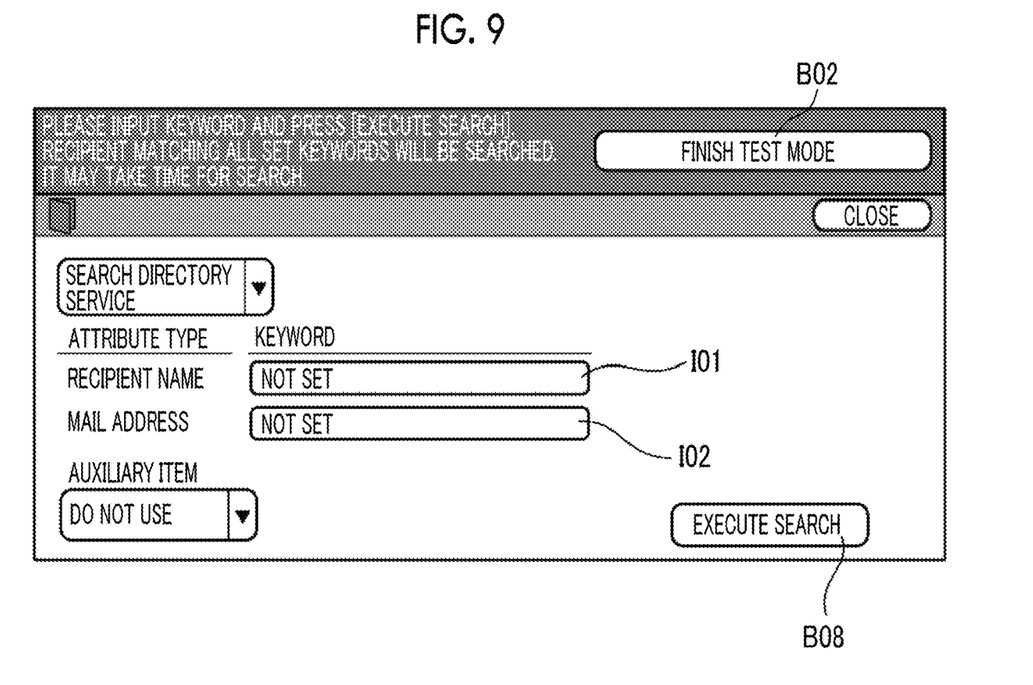
FIG. 9 is a diagram illustrating one example of a screen displayed on the display unit 110 in the simulation related to the network access.

In a case where an instruction to perform a directory search for the mail address is provided as described above, the control unit 120 displays a search keyword input screen illustrated in FIG. 9 on the display unit 110. The user who visually recognizes the search keyword input screen may instruct the information processing apparatus 1 to execute a directory search for the mail address with a keyword input in an input area I01 (or an input area I02) as a search keyword, by inputting a keyword related to the recipient (or a keyword related to the mail address) into the input area I01 (or the input area I02) and performing a touch operation on an execute search button B08. The control unit 120 that is instructed to execute the directory search as described above causes the execution section 230 to simulate the directory search. In a case where the directory search is actually executed, charging may be incurred by data communication for the directory search. However, in the case of a simulation of the directory search, data communication does not need to be actually performed, and charging is not incurred.

Figure 10:
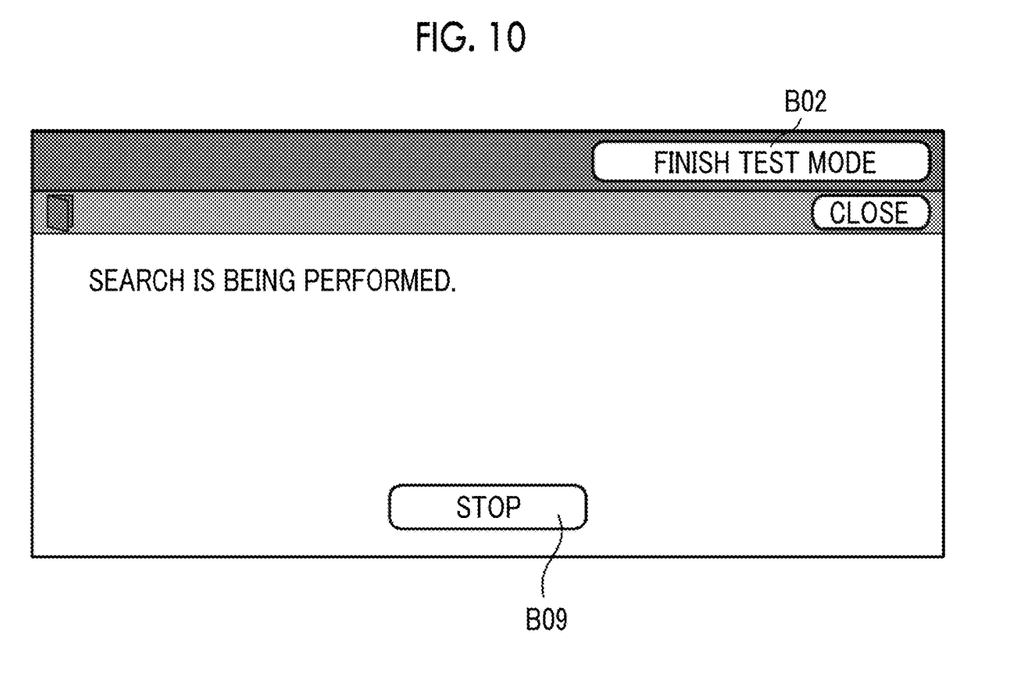
FIG. 10 is a diagram illustrating one example of a screen displayed on the display unit 110 in the simulation related to the network access.
Figure 11:
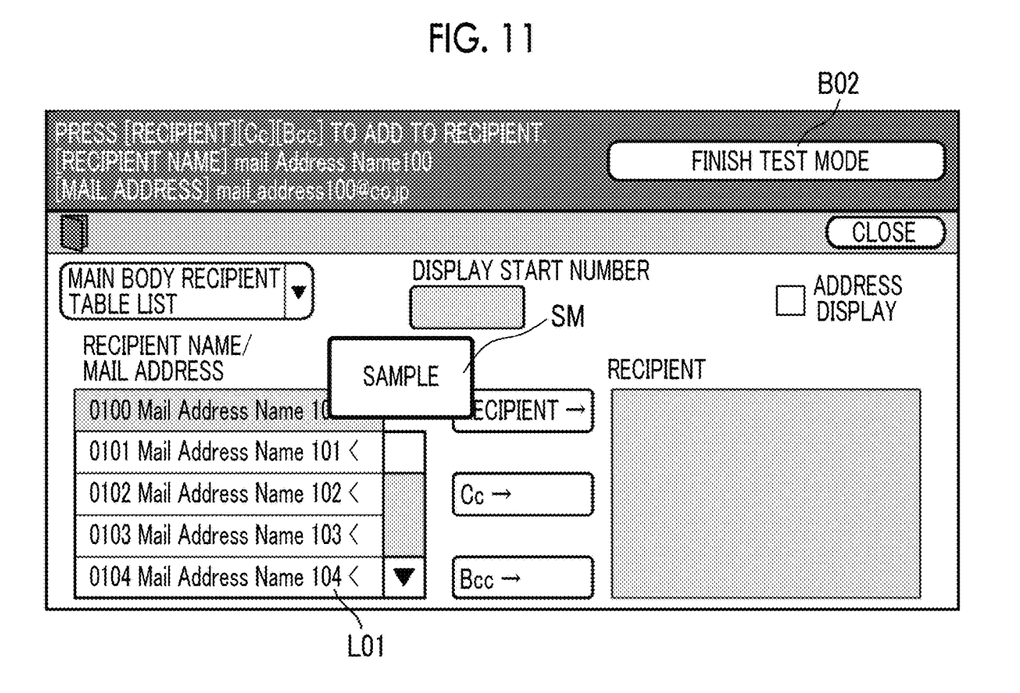
FIG. 11 is a diagram illustrating one example of a screen displayed on the display unit 110 in the simulation related to the network access.

After the start of the simulation, the control unit 120 displays a notification screen illustrated in FIG. 10 on the display unit 110 until the simulation is completed. In a case where a touch operation is performed on a "stop button" B09 in the notification screen, the execution section 230 stops executing the simulation. In a case where the simulation is completed, the first display control section 240 adds an identification image SM (refer to FIG. 11) to the mail address acquired as a result of simulation (simulation of the directory search for the mail address) and displays the mail address on the "recipient name/mail address list" L01 in the recipient edit screen. The identification image SM indicates that the mail address is a result of simulation. In the example illustrated in FIG. 11, the mail address acquired by the simulation is displayed in the first row of the "recipient name/mail address list" L01.

As described thus far, even in the case of the function accompanying execution of the process unrestorable to the state before execution, the information processing apparatus 1 of the present exemplary embodiment enables the user to test the function in the simulation mode by simulating the process instead of executing the process. Thus, the user of the information processing apparatus 1 may test even an unknown function with certainty.

Second Exemplary Embodiment

In the first exemplary embodiment, the notification screen (refer to FIG. 5) is displayed on the display unit 110 by a trigger event that an instruction to switch to the simulation mode is provided by the user. The operation of the simulation mode is started after the user is caused to specify which one of the simulation related to network access or the simulation related to original document reading is to be executed. Meanwhile, the present exemplary embodiment is different from the first exemplary embodiment in that the operation mode is switched to the simulation mode by a trigger event that the user performs an operation for using any of the plural functions of the information processing apparatus 1 on the information processing apparatus 1 that is operating in the normal mode.

Figure 12:
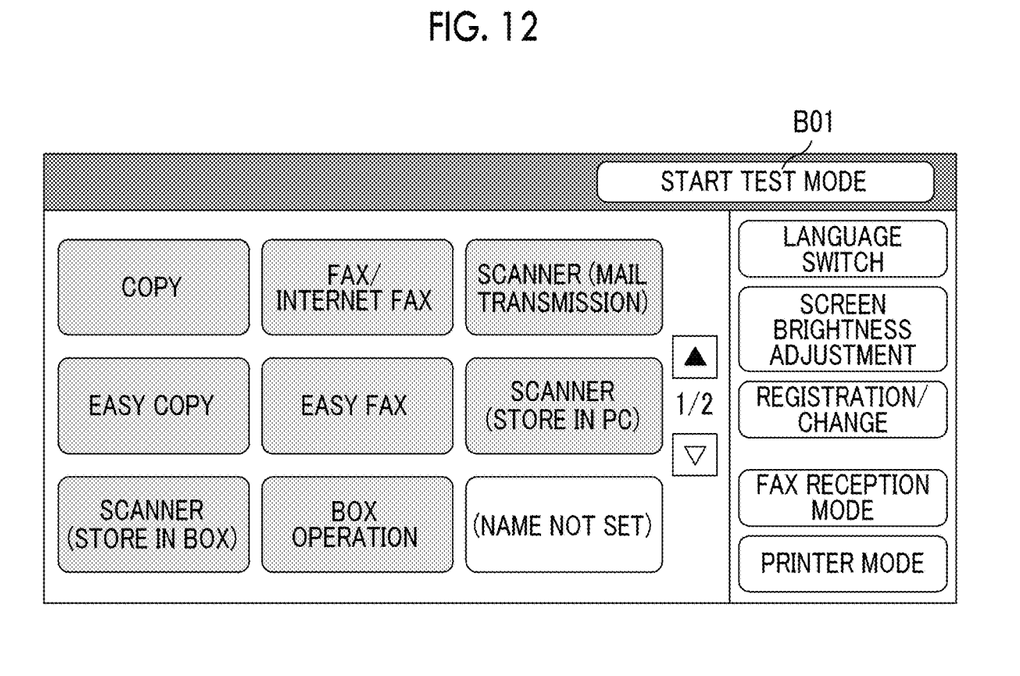
FIG. 12 is a diagram illustrating one example of a display screen in a second exemplary embodiment of the present invention.

FIG. 12 is a diagram illustrating one example of a menu screen displayed on the display unit 110 in the normal mode by the information processing apparatus 1 of the present exemplary embodiment. As is apparent from comparison between FIG. 12 and FIG. 2, the menu screen at the time of the normal mode in the present exemplary embodiment is different from the menu screen (refer to FIG. 2) at the time of the normal mode in the first exemplary embodiment in that a function button "name not set" (hereinafter, a name not set button) is disposed instead of the function button corresponding to "job memory". The name not set button is a function button corresponding to an application program (application program that operates in an unknown manner) that is installed on the information processing apparatus 1 without the knowledge of an operation manager of the information processing apparatus 1. Operating the application program in the simulation mode is useful for confirming, with certainty, the operation of the application program that operates in an unknown manner. Hereinafter, the operation of the information processing apparatus 1 in a case where the name not set button is pressed will be illustratively described in a case where the application program is an application program that accompanies the use of the automatic transport mechanism.

In a case where the user who visually recognizes the menu screen illustrated in FIG. 12 performs a touch operation on the name not set button, the operation content data indicating the content of operation is provided to the control unit 120 from the operation reception unit 100, and the content of operation performed by the user is delivered to the control unit 120. Accordingly, the control unit 120 that senses the touch operation performed on the name not set button starts executing the application program corresponding to the name not set button. As described above, the application program is an application program that uses the automatic transport mechanism. Thus, the control unit 120 that is operating in accordance with the application program displays a notification screen (refer to FIG. 13A) on the display unit 110. The notification screen prompts the user to set the original document in the automatic transport mechanism. In a case where the user who visually recognizes the notification screen sets the original document in the automatic transport mechanism, the control unit 120 senses the original document set in the automatic transport mechanism. Then, the control unit 120 determines that the simulation mode is automatically applied for this process, and notifies the user that the simulation mode is automatically applied, by displaying a screen illustrated in FIG. 13B on the display unit 110. In this example where the user's permission to execute the process in the simulation mode is requested, a button B19 and a button B20 are displayed. In a case where the user touches the button B19, operation is performed in the simulation mode. In a case where the user desires execution in the normal mode and does not desire execution in the simulation mode, the user touches the button B20. Then, the control unit 120 sets the operation mode to the normal mode.

Figure 13A:
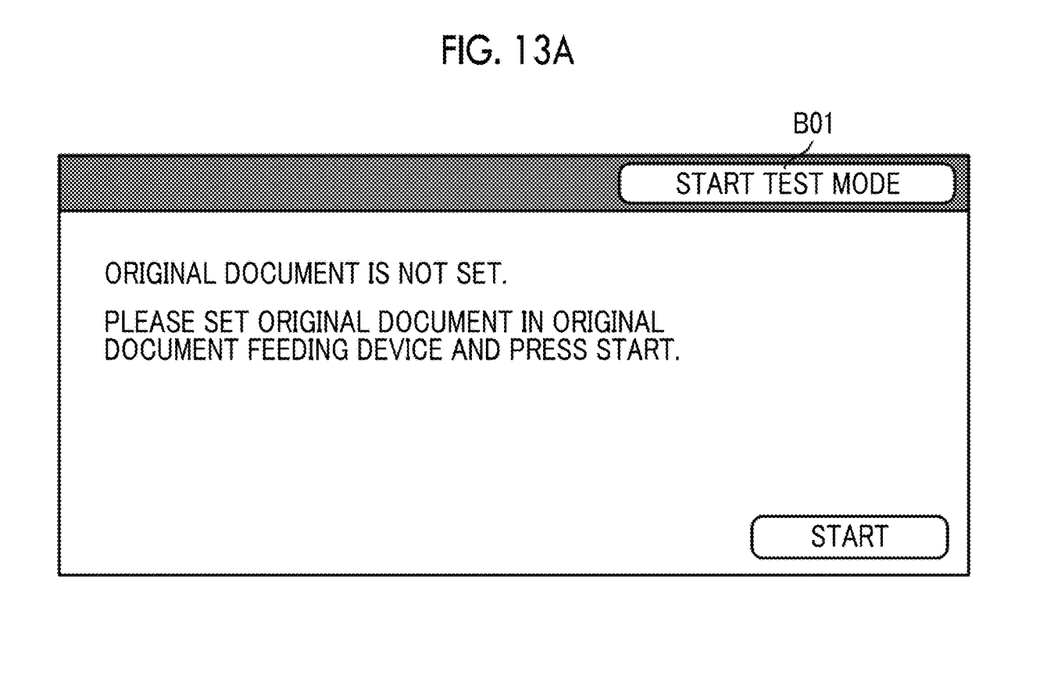
FIG. 13A is a diagram illustrating one example of a display screen in the second exemplary embodiment.
Figure 13B:
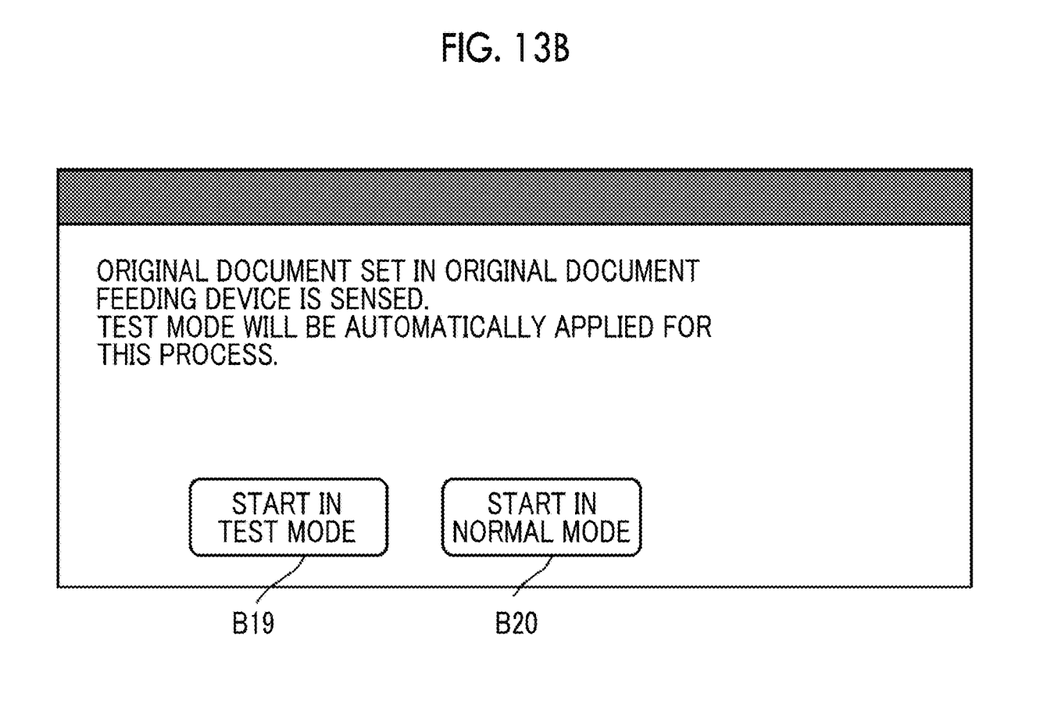
FIG. 13B is a diagram illustrating one example of a display screen in the second exemplary embodiment.
Figure 14:
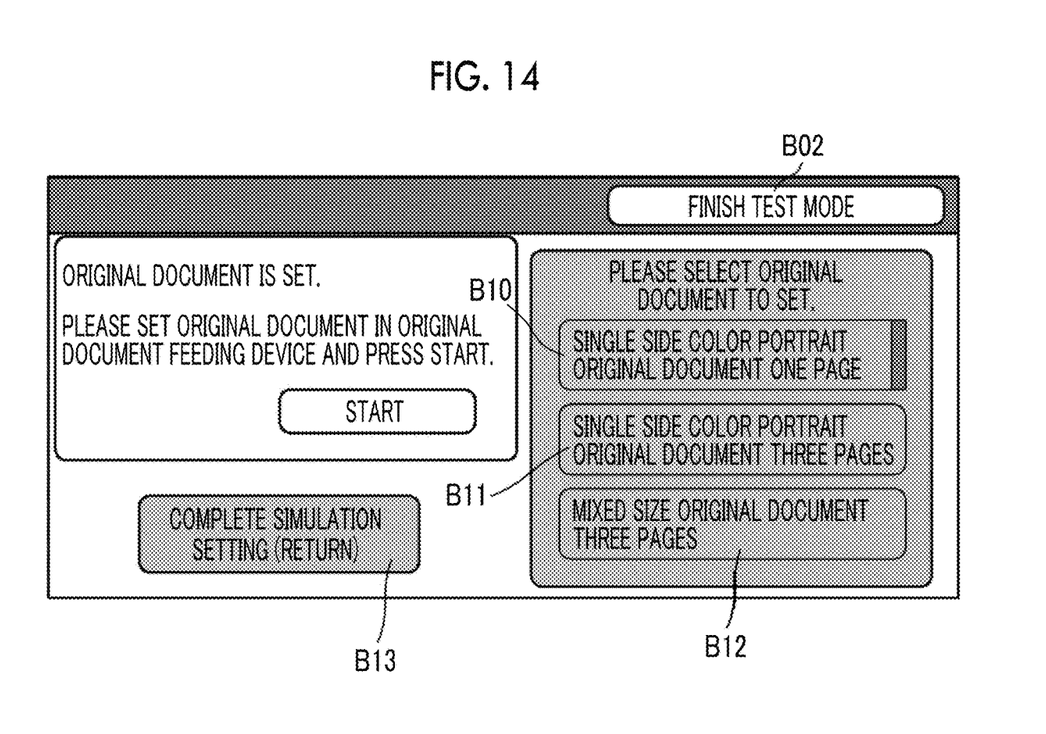
FIG. 14 is a diagram illustrating one example of a display screen in the second exemplary embodiment.

In a case where the button B19 in FIG. 13B is touched, the control unit 120 switches the operation mode of the information processing apparatus 1 to the simulation mode from the normal mode and displays a simulation screen illustrated in FIG. 14 on the display unit 110. As is apparent from comparison between FIG. 14 and FIG. 13A, the simulation screen of the present exemplary embodiment includes a shrunk image of the notification screen illustrated in FIG. 13A, virtual operators B10, B11, and B12 for causing the user to specify the type (single side color portrait original document one page, single side color portrait original document three pages, or mixed size original document three pages) of original document set in the automatic transport mechanism, a complete simulation setting button B13, and the "finish test mode button" B02. In a case where the user who visually recognizes the simulation screen illustrated in FIG. 14 performs an operation of specifying the type of original document (touch operation performed on any of the virtual operators B10 to B12) and performs a touch operation on the complete simulation setting button B13, the operation content data representing the content of operation is provided to the control unit 120.

The control unit 120 may automatically switch the operation mode without notifying the user of automatic switching of the operation mode or requesting the user's permission for automatic switching. In this case, the screen illustrated in FIG. 13B may not be displayed.

Figure 15:
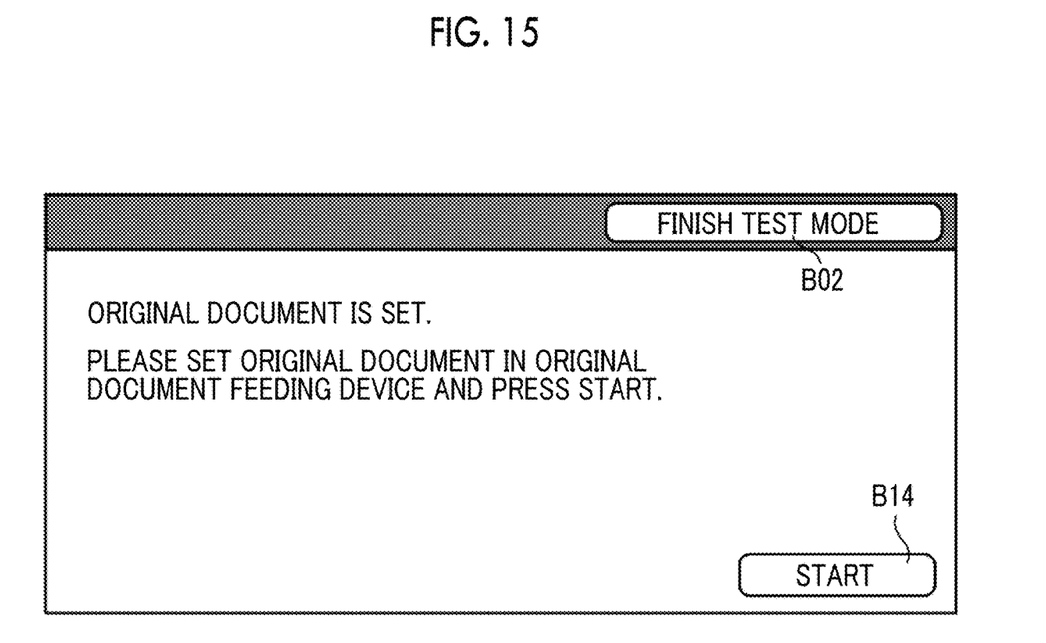
FIG. 15 is a diagram illustrating one example of a display screen in the second exemplary embodiment.
Figure 16:
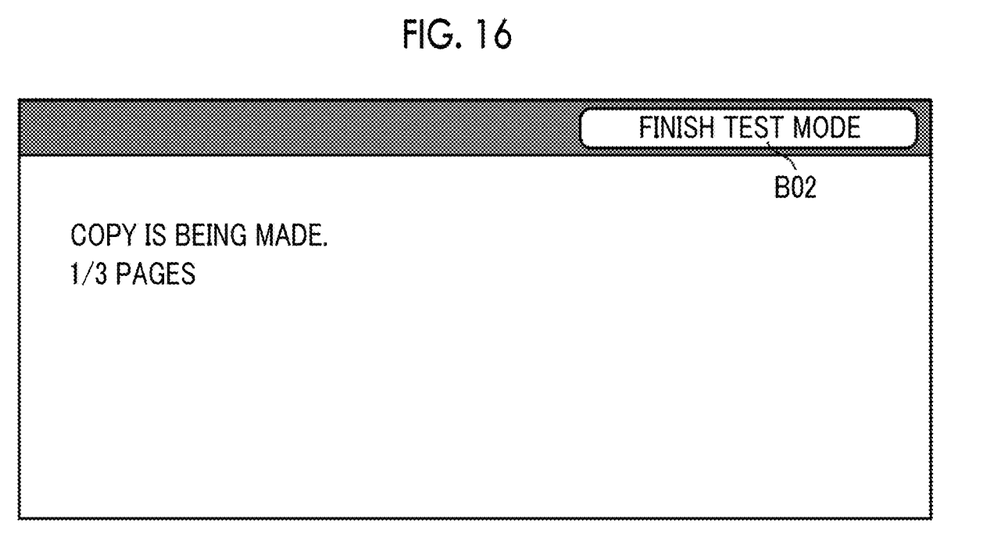
FIG. 16 is a diagram illustrating one example of a display screen in the second exemplary embodiment.
Figure 17:
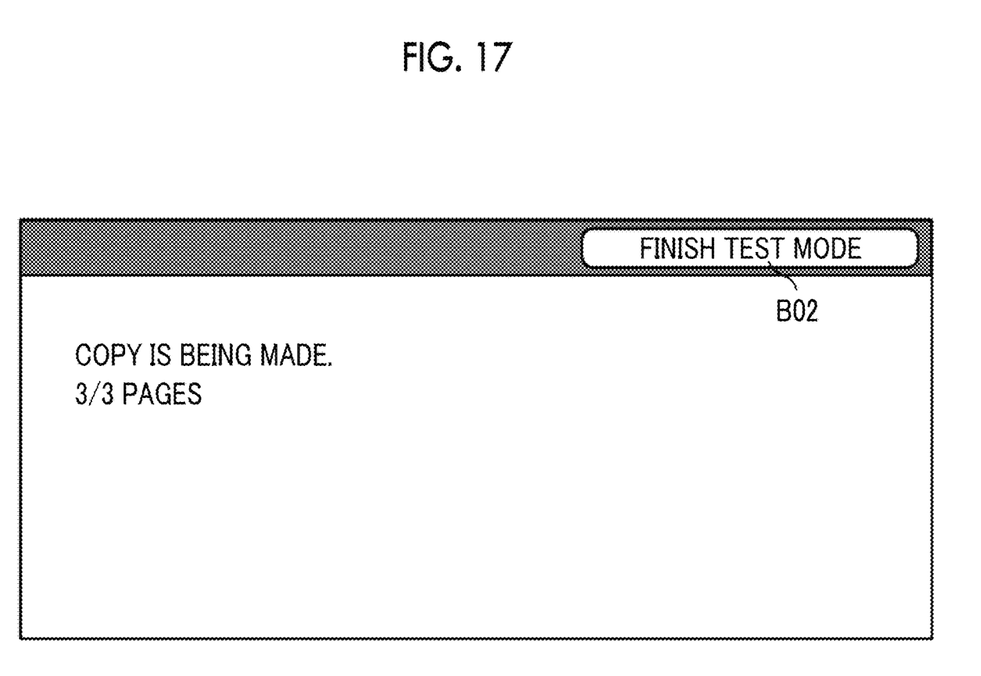
FIG. 17 is a diagram illustrating one example of a display screen in the second exemplary embodiment.
Figure 18:
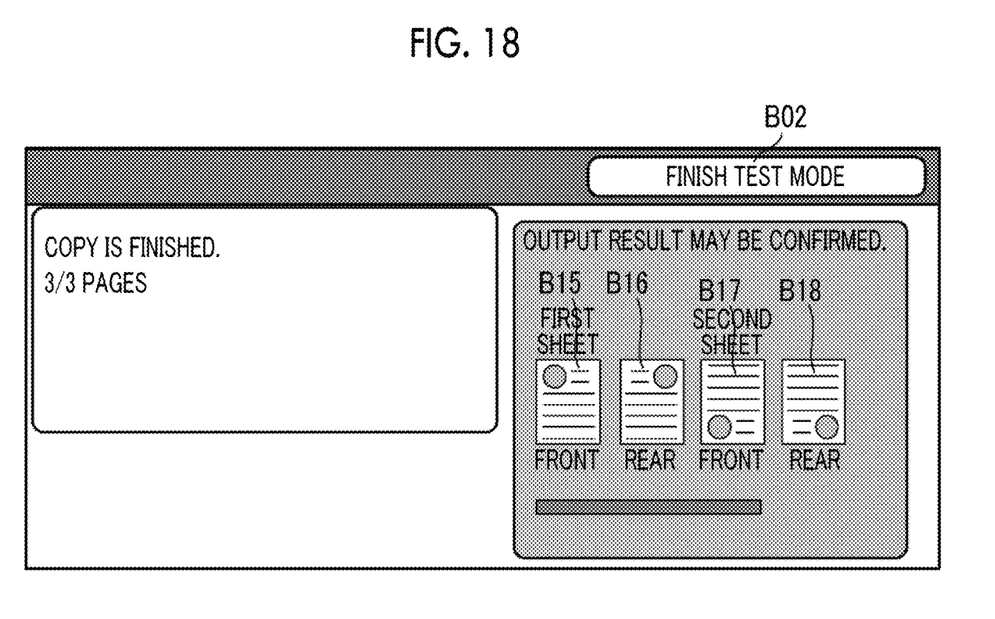
FIG. 18 is a diagram illustrating one example of a display screen in the second exemplary embodiment.

With a trigger event that a touch operation is performed on the complete simulation setting button B13, the control unit 120 displays a notification screen illustrated in FIG. 15 on the display unit 110 and prompts the user to execute a touch operation on a start button B14. In a case where a touch operation is performed on the start button B14, the control unit 120 causes the automatic transport mechanism to automatically transport the original document, causes the image reading module to execute image reading, and simulates the process of the application program with respect to the read image. The control unit 120 causes the display screen of the display unit 110 to sequentially transition to the notification screen illustrated in FIG. 16 and the notification screen illustrated in FIG. 17 along with the progress in the simulation. In a case where the simulation is completed, the first display control section 240 displays a simulation result notification screen illustrated in FIG. 18 on the display unit 110. The user who visually recognizes the simulation result notification screen may confirm the result of simulation of the process of the application program with respect to the image corresponding to the front side and the rear side of each of three sheets of the original document set in the automatic transport mechanism and may make a confirmation similar to that of actual output. For example, by performing a touch operation on a virtual operator B15, the result of simulation for the image of the front side of the first sheet of the original document may be displayed on the display unit 110. Similarly, by performing a touch operation on a virtual operator B16, the result of simulation for the image of the rear side of the first sheet of the original document may be displayed on the display unit 110. By performing a touch operation on a virtual operator B17, the result of simulation for the image of the front side of the second sheet of the original document may be displayed on the display unit 110. By performing a touch operation on a virtual operator B18, the result of simulation for the image of the rear side of the second sheet of the original document may be displayed on the display unit 110.

As described thus far, in the information processing apparatus 1 of the present exemplary embodiment, the result of the function for which the process unrestorable to the state before execution of the operation content is included in the process for implementing the function may be confirmed by simulation. Thus, the user may feel certain in the case of using an unknown function.

Modification

While the first and second exemplary embodiments of the present invention are described thus far, each exemplary embodiment may be modified as in the following modification examples. Plural modification examples may be combined with each other.

Modification Example 1

A first notification section that notifies the user that the process unrestorable to the state before execution is included in a case where the process unrestorable to the state before execution is included in the process for implementing the function specified by the user may be further disposed in the information processing apparatus 1. According to such an aspect, the user may securely recognize that the process unrestorable to the state before execution is included in the process for implementing the function specified by the user.

In another exemplary aspect, a control section that controls the execution section 230 to execute the process for implementing the function received by the first specifying section 210 in the simulation mode regardless of the specification received by the second specifying section 220 in a case where the process unrestorable to the state before execution is included in the process for implementing the function specified by the user may be further disposed in the information processing apparatus 1. According to such an aspect, careless execution of the process unrestorable to the state before execution may be securely avoided.

Modification Example 2

Figure 19:
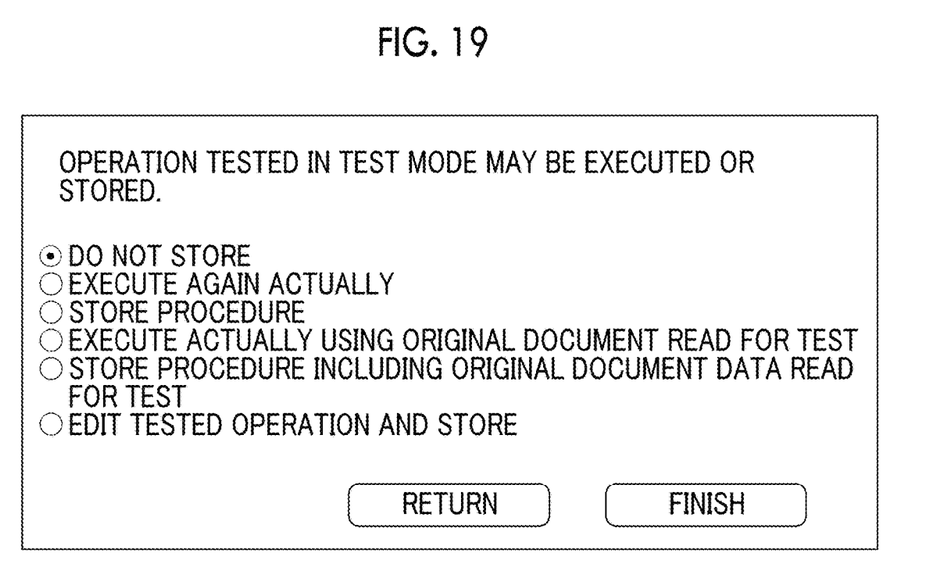
FIG. 19 is a diagram illustrating one example of a notification screen of Modification Example 2.

A second notification section that performs notification for supporting an operation for performing a process executed in the normal mode in a case where the process executed in the simulation mode is included in the process for implementing the function received by the first specifying section 210 in the normal mode may be further disposed. A specific example of such a notification is exemplified by a notification screen illustrated in FIG. 19. A timing at which switching is performed to the normal mode from the simulation mode is considered as a display timing of the notification screen illustrated in FIG. 19. The user who visually recognizes the notification screen illustrated in FIG. 19 may store an operation procedure performed by the user in the simulation mode and use the operation procedure in operation in the normal mode by selecting a radio button corresponding to any of "store procedure", "store procedure including original document data read for test", or "edit tested operation and store".

In order for the user to store the operation procedure performed in the simulation mode, a storage section, a second display control section, and a reception section below may be disposed in the information processing apparatus 1 of each exemplary embodiment. The storage section stores data that indicates the content and execution order of operation performed by the user in a case where the process for implementing the function received by the first specifying section 210 is configured with plural processes that are performed based on plural operations received from the user. The second display control section displays the result of a process corresponding to each operation in a case where execution is performed in the simulation mode. The reception section receives one or more operations among the plural operations. The execution section implements the specified function again by executing the process again based on the operation performed again for the specified operation.

Figure 20:
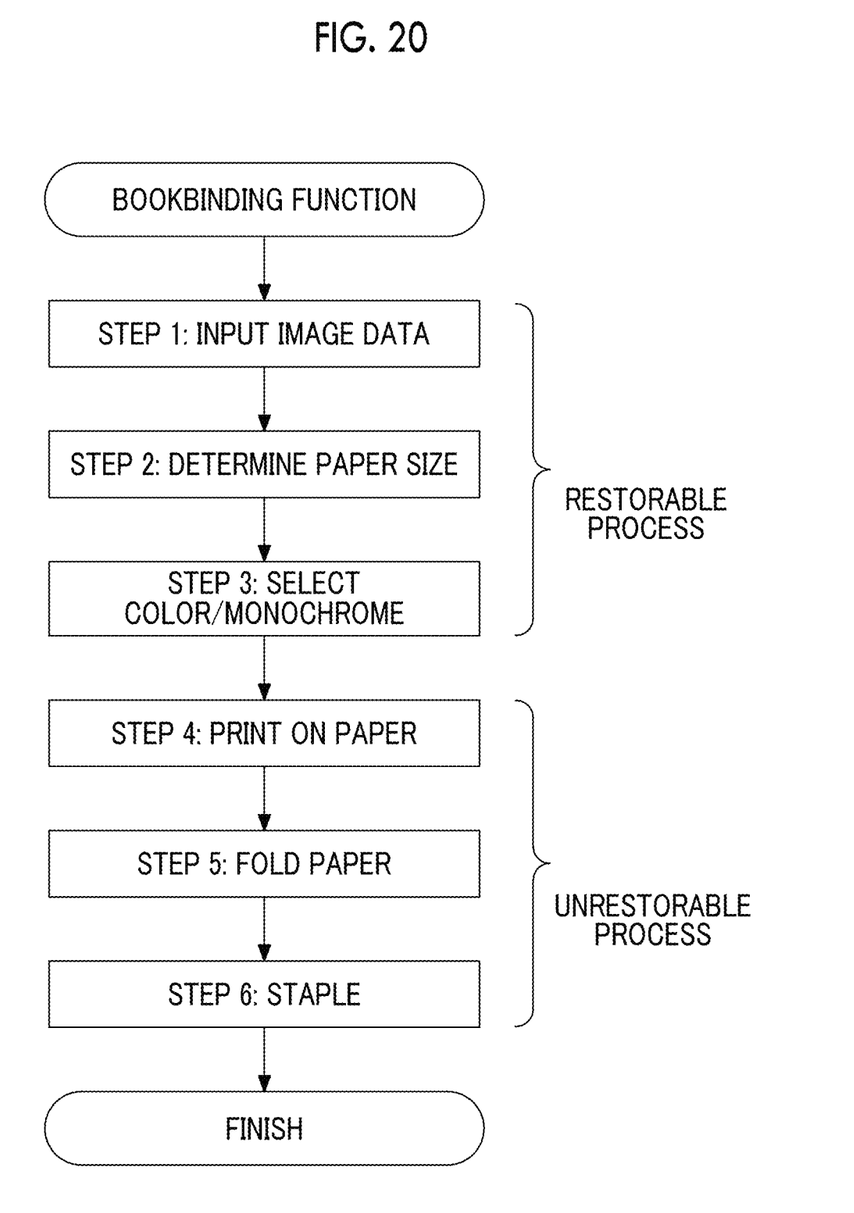
FIG. 20 is a diagram illustrating an example of a function including plural processes.

For example, as illustrated in FIG. 20, it is assumed that the user specifies execution of a series of functions (bookbinding function) including six processes (steps) of inputting image data, determining an output paper size, setting color/monochrome, printing on paper, folding printed paper, and stapling paper. In addition, it is assumed that the printing process, the folding process, and the stapling process are defined as unrestorable processes from the viewpoint of, for example, incurring charging. In this case, due to an instruction from the user or as a result of automatic determination performed by the information processing apparatus 1, the printing process, folding, and stapling are executed in the simulation mode, and the other processes are executed in the normal mode. For example, a folding line and a stapling location are printed on the paper, and the user may substantially recognize a state after bookbinding (for example, the visibility of an image in the vicinity of a fold).

In this case, by storing the procedure set in steps S1 to S4 and the content of setting and reading and editing the content as needed, the final state of the series of functions may be repeatedly simulated by changing conditions with the minimum number of input operations needed.

Modification Example 3

While an example of applying the present invention to the image forming apparatus is described in each exemplary embodiment, the present invention may be applied to a portable information terminal such as a smartphone or a tablet terminal, or a stationary or laptop personal computer. The point is that as long as an information processing apparatus has plural functions, and the plural functions include at least one function that accompanies execution of the process unrestorable to the state before execution, applying the present invention thereto may reduce the uncertainty of the user and enable the user to feel certain with respect to test of the function accompanying execution of the process unrestorable to the state before execution.

Modification Example 4

While an example of software implementation of the first specifying section 210, the second specifying section 220, and the execution section 230 that noticeably show the features of the present invention is illustrated in the exemplary embodiments, any one or all of these sections may be implemented by hardware circuits. The software may be provided as a recording on a computer readable recording medium such as an optical recording medium or a semiconductor memory, and the software may be read from the recording medium and installed. The software may be provided through an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first specifying section comprising a display that receives specification of an execution target function from a plurality of functions;
a second specifying section comprising the display that receives specification of a normal mode or a simulation mode; and
an execution section comprising a processor that executes a process for implementing the specified function in the mode received by the second specifying section,
wherein the display notifies a user in a case where the process for implementing the specified function includes a process unrestorable to a state before execution, and
the processor executes the process for implementing the function received by the first specifying section in the simulation mode regardless of the specification received by the second specifying section in a case where the process for implementing the received function includes the process unrestorable to the state before execution.

2. The information processing apparatus according to claim 1,
wherein the process unrestorable to the state before execution includes at least any of a process of reading an original document using an automatic transport mechanism and forming an identification image on the read original document, a data communication process accompanying a charging process, a process of logging in to a network, or a process of writing data into a predetermined device.

3. The information processing apparatus according to claim 2, wherein the processor serving as a first display control section that displays a result of the process for implementing the received function in a case where the process for implementing the received function includes a process executed in the simulation mode, such that a result of the process executed in the simulation mode is distinguished from a result of a process executed in the normal mode.

4. The information processing apparatus according to claim 3, wherein
the display performs notification in a case where the process for implementing the received function includes a process executed in the simulation mode, in order to support an operation for performing the process in the normal mode.

5. The information processing apparatus according to claim 2, wherein
the display performs notification in a case where the process for implementing the received function includes a process executed in the simulation mode, in order to support an operation for performing the process in the normal mode.

6. The information processing apparatus according to claim 1, wherein
the processor serving as a first display control section that displays a result of the process for implementing the received function in a case where the process for implementing the received function includes a process executed in the simulation mode, such that a result of the process executed in the simulation mode is distinguished from a result of a process executed in the normal mode.

7. The information processing apparatus according to claim 6, wherein
the display performs notification in a case where the process for implementing the received function includes a process executed in the simulation mode, in order to support an operation for performing the process in the normal mode.

8. The information processing apparatus according to claim 1, wherein
the display performs notification in a case where the process for implementing the received function includes a process executed in the simulation mode, in order to support an operation for performing the process in the normal mode.

9. An information processing apparatus comprising:
a first specifying section comprising a display that receives specification of an execution target function from a plurality of functions;
a second specifying section comprising the display that receives specification of a normal mode or a simulation mode; and
an execution section comprising a processor that executes a process for implementing the specified function in the mode received by the second specifying section,
wherein the process for implementing the function is configured with a plurality of processes that are performed based on a plurality of operations received from a user,
the information processing apparatus further comprises:
a memory that stores an operation performed by the user with respect to execution of the received function;
the first display control section that displays a result of a process corresponding to each operation in a case where execution is performed in the simulation mode; and
a reception sensor that receives one or more operations among the plurality of operations, and
the execution section implements the specified function again by executing a process again based on an operation that is performed again for the specified operation.

10. The information processing apparatus according to claim 9,
wherein the display notifies a user in a case where the process for implementing the specified function includes a process unrestorable to a state before execution.

11. The information processing apparatus according to claim 9,
wherein the processor executes the process for implementing the function received by the first specifying section in the simulation mode regardless of the specification received by the second specifying section in a case where the process for implementing the received function includes the process unrestorable to the state before execution.

12. A non-transitory computer readable medium storing a program causing a computer to function as:
a first specifying section comprising a display that receives specification of an execution target function from a plurality of functions;
a second specifying section comprising the display that receives specification of a normal mode or a simulation mode; and
an execution section comprising a processor that executes a process for implementing the specified function in the mode received by the second specifying section,
wherein the display notifies a user in a case where the process for implementing the specified function includes a process unrestorable to a state before execution, and
the processor executes the process for implementing the function received by the first specifying section in the simulation mode regardless of the specification received by the second specifying section in a case where the process for implementing the received function includes the process unrestorable to the state before execution.

* * * * *